May 17, 1938.  J. B. COOPER  2,117,945
METER CABINET
Filed May 12, 1937   2 Sheets-Sheet 1
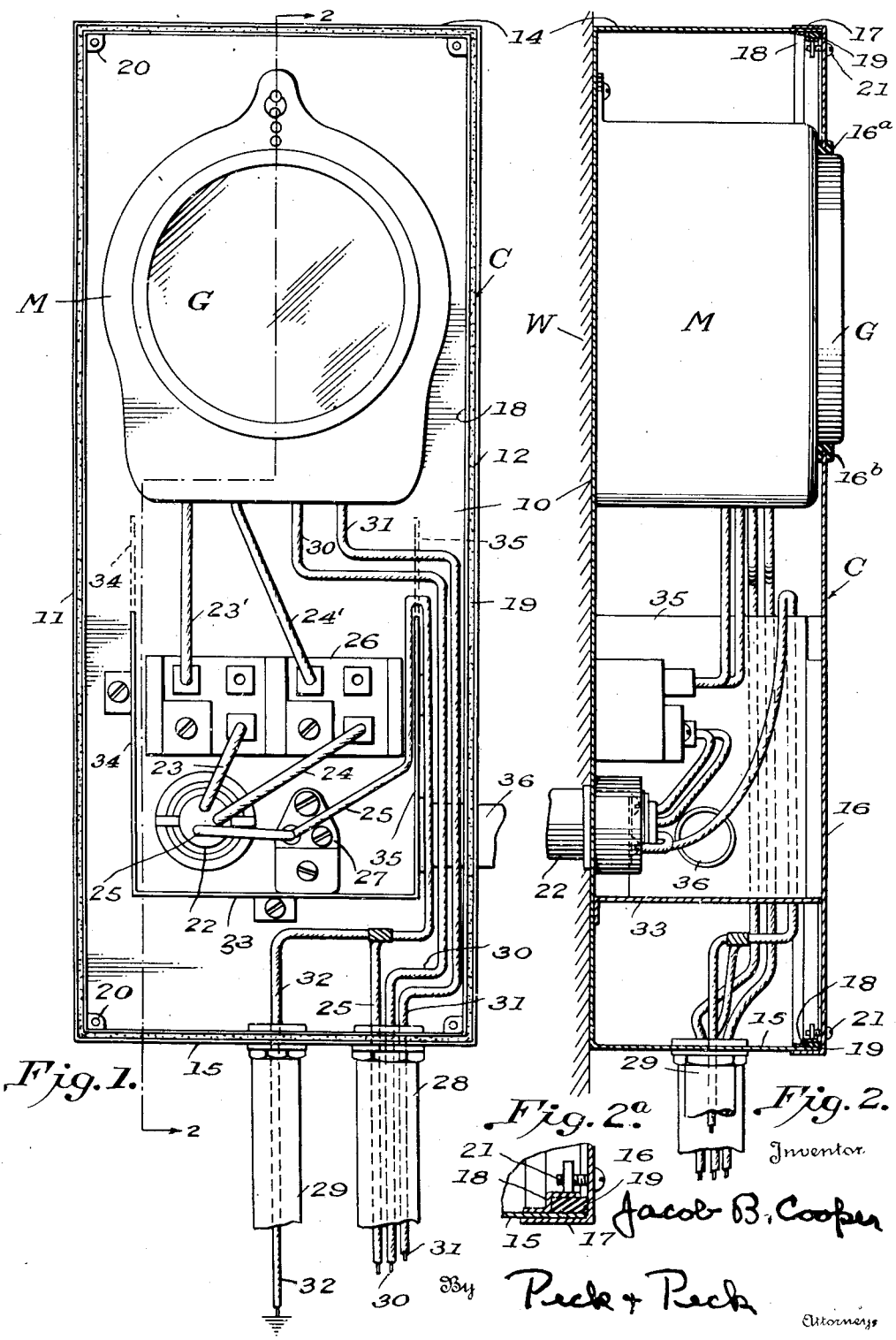

May 17, 1938.                J. B. COOPER                2,117,945
                             METER CABINET
                          Filed May 12, 1937           2 Sheets-Sheet 2
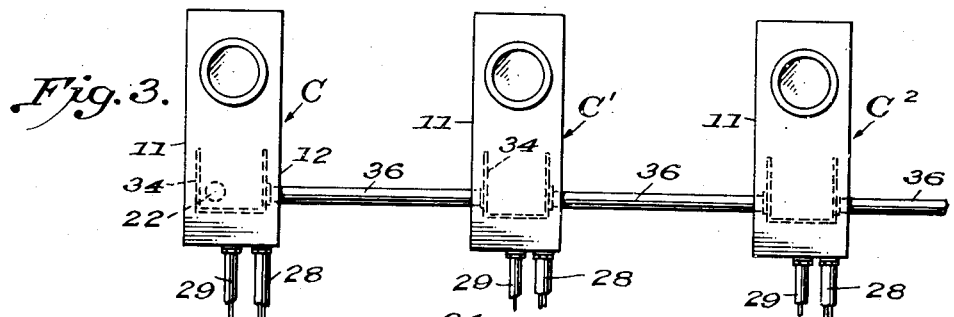
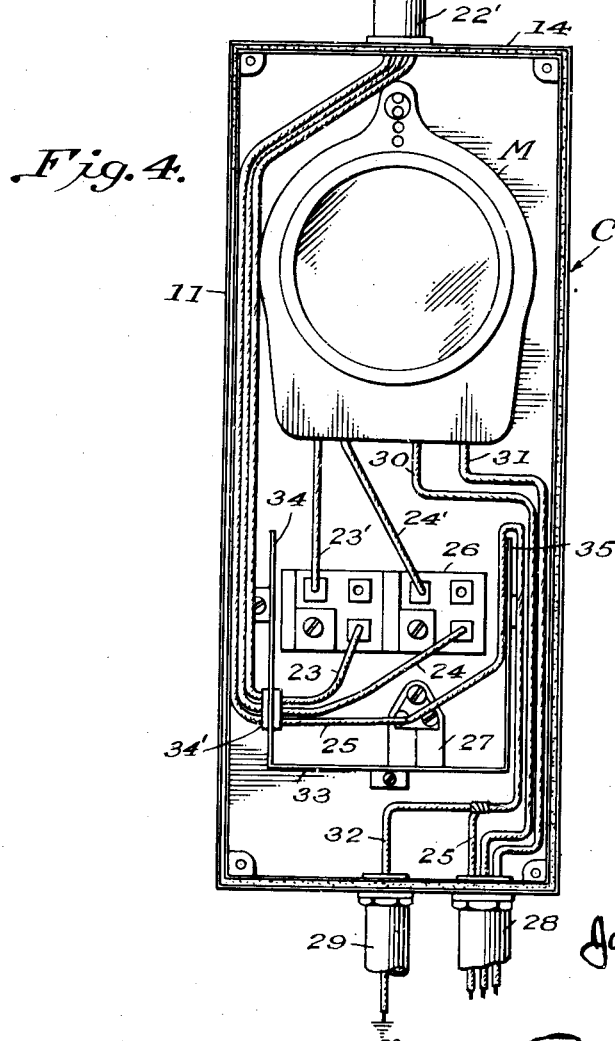
Inventor
Jacob B. Cooper
By Peck + Peck
Attorneys Patented May 17, 1938

2,117,945

UNITED STATES PATENT OFFICE 2,117,945

METER CABINET

Jacob B. Cooper, Park Ridge, N. J.

Application May 12, 1937, Serial No. 142,318

6 Claims. (Cl. 171—34)

This invention relates to certain improvements in meter cabinets and the nature and objects of the invention will be readily apparent to and recognized by those skilled in the art in the light of the following explanation and detailed description of the accompanying drawings illustrating what I now believe to be the preferred embodiments or mechanical expressions of my invention from among various other forms, designs, arrangements, constructions and combinations of which the invention is capable within the broad spirit and scope thereof.

My present invention is directed to the problem of preventing the unauthorized tapping of or connection into the feed or supply wires of an electrical power or current supply line in advance of a current meter in such line, for the purpose of stealing unmetered current from the line. This unauthorized tapping of supply lines in advance of meters has developed into a considerable source of current loss to electrical power supply companies and such unauthorized tapping and diversion of current is rendered relatively easy due to the arrangements now in general use for mounting and installing current meters.

With the generally used installations and mounting of a current meter and electric supply line to a consumer, the meter may be enclosed in a box or casing into which the supply wires are led through a suitable conduit or opening, usually at the back or rear of the meter containing box or case. The feed or supply lines are connected to the meter and the load line or lines, the current which has passed through the meter is led from the meter box or casing through a suitable conduit to an adjacent or proximate switch box and/or fuse box. A rather widespread practice of stealing current from supply lines feeding such meter installations has been developed and this practice usually consists in inserting a sharpened wire or other current conducting instrument inwardly through the load or metered current line conduit which leads from the meter box or casing to the adjacent switch box or fuse box. A wire or other instrument so inserted is extended into the meter box or casing and moved or positioned until contact is made with one of the feed or input wires of the circuit which pass through the box to the meter. Once this contact is made the unauthorized circuit is completed by a suitable connection with the ground line or the grounded box or casing, as will be readily understood.

With these meter installations, an inspector will readily detect any type of unauthorized tapping which is carried out by either cutting an opening through the meter box or casing or forcing up the closure or lid for such a meter box, or by cutting through any of the conduits to or from the box from the outside. Such methods, because of their ready detection, do not present any serious problem and are readily prevented or eliminated by periodic inspections of the meter installations. However, the type of unauthorized tapping to which my present invention is directed and which has been briefly outlined above, does present a serious problem because of its difficulty or detection by the usual meter inspections or periodic meter readings.

A general object of the invention is to prevent the unauthorized tapping of the feed or supply lines to an electric current meter in advance of the meter for the purpose of stealing or diverting current therefrom, by inserting wires or other instruments through a conduit or conduits opening into the meter or the meter enclosure; and to thereby restrict any such unauthorized tapping attempts to locations readily visible at the exterior of the meter enclosure or the conduits leading to such enclosure.

In accordance with a fundamental feature of my invention in carrying out the foregoing general object, I arrange a current meter and a meter cabinet or enclosing casing therefor in relation to the feed or supply wires to the meter and the load or current output wires from the meter, and interpose in the proper locations relative to and in cooperation with the meter and the several wires of the circuit within the cabinet, a protecting barrier or wall guard which will block and prevent the insertion of wires or other instruments into the cabinet through any of the authorized openings there-into for the purpose of making contact with and tapping, within the cabinet, any of the feed or supply wires to and in advance of the meter.

A further feature of the invention resides in providing such barrier or guard wall arrangements in a meter cabinet of the type having a removable closure, so that this closure will when in mounted position on the cabinet also form a closure for one side of the space within the barrier or guard walls.

Another object and feature of my invention is the provision of practical and efficient designs, constructions and arrangements of meter cabinet for carrying out the purposes of the invention, and which cabinets may be readily manufactured at relatively low cost from standard, stock materials and which are of a design and construction to readily meet the requirements of building regulations and underwriters.

With the foregoing general objects and results in view as well as certain others that will be readily apparent from the following descriptions, my invention consists in certain novel and useful features in design and in constructions, arrangements and combinations of parts and elements, all as will be more fully and particularly referred to and specified hereinafter.

Referring to the accompanying drawings in which similar reference characters refer to corresponding parts throughout the several figures thereof:—

Fig. 1 is a view in front elevation of a meter cabinet embodying my invention, with the cabinet cover removed and showing particularly an arrangement of the protecting guard walls in their relation to the meter and the supply or feed wires and the load wires forming the circuit to and through the meter.

Fig. 2 is a vertical longitudinal section through the meter box and its arrangement of Fig. 1 taken as on the line 2—2 of Fig. 1.

Fig. 2a is a detailed sectional view enlarged to show a possible construction for the cover sealing gasket and cover securing means.

Fig. 3 is a more or less diagrammatic view in front elevation of a series of meter cabinets of the type of Figs. 1 and 2, showing the arrangement by which such meter cabinets may be arranged adjacent each other with the feed or supply lines of the circuit passing to successive meters.

Fig. 4 is a view in front elevation of a modified form and arrangement of meter cabinet embodying the invention, with the cabinet cover removed to show the location of the feed and load wires to and from the meter.

In Figs. 1 and 2 of the drawings, I have illustreated by way of example and not of limitation, a form of meter cabinet of my invention adapted to be mounted in vertically disposed position upon a wall of a building or other structure and with the feed or supply wires of the circuit led into the cabinet through a rear wall thereof; and with the load or output wires from the meter within the cabinet led from the cabinet through the lower side wall thereof. In the illustrated example, the meter cabinet C is preferably formed of sheet metal such, for example, as sheet steel or the like of a suitable gauge and embodies the rear wall 10, the opposite side walls 11 and 12 and the opposite end walls 14 and 15. A cover or closure 16 is provided for fitting over the forward open side of the cabinet in order to close the same and this cover is formed with the opening 16a therein for receiving and fitting over the meter glass of a meter mounted within the cabinet as will be explained hereinafter.

The cover or closure 16 is also provided with a depending flange 17 there-around which fits down over the exterior of the side and end walls of the cabinet when the cover is in mounted position thereon. Provision is made for sealing the cover 16 when in mounted position on the cabinet in order to prevent entry of moisture or other foreign matter into the cabinet. In the instant example, the sealing of the cover is carried out by securing flange strips or members 18 around the inner sides of the opposite side and end walls of the cabinet adjacent the outer edges thereof with the outer portions of the flange strips spaced from the cabinet walls so as to form therewith a groove for receiving a suitable sealing strip or gasket 19. The outer edge of the gasket 19 is adapted to be engaged by and form a sealing fit against the inner side of the cover 16 when the latter is in mounted position on the cabinet.

Any suitable arrangement for releasably fastening and securing the cover 16 in closed, cabinet sealing position may be provided, and in the example hereof, tapped ears or lugs 20 are formed or secured on the interior of the cabinet at the corners thereof, respectively, and adjacent the outer open side of the cabinet. The cover 16 is provided with suitable fastening elements such as the screws 21 which thread into the tapped ears or lugs 20 and thus serve to draw the cover 16 tightly into cabinet closing and sealing position, as will be clear by reference to Figs. 2 and 2a of the drawings.

The cabinet C is preferably mounted and fixed in vertically disposed position on and against a vertical structure, such as a wall W of a building (see Fig. 2), and a current meter M of any suitable or desired type is mounted and secured within the upper portion of the cabinet with the lens or glass G of the meter alined with and received in the opening 16a formed in the cover 16, as will be clear by reference to Fig. 2. It is preferable to seal the cover 16 around and between the meter glass G and the cover opening 16a, and as an example of such sealing, I happen to show an annular or circular gasket 16b of rubber or other suitable material secured over and around the edge of the cover opening 16a and forming a sealing engagement with and around the meter glass G when the cover is in mounted position on and closing the cabinet.

The form of cabinet C of Figs. 1 and 2 mounted on the wall W has the feed or supply wires entering the cabinet through the rear wall 10 thereof in the lower portion of the cabinet spaced below the meter M by means of a suitable conduit or the like 22 which is secured in any well-known manner in an opening formed through the cabinet rear wall. I happen to have selected for purposes of the present example, a supply system of the so-called three-wire type familiar in the art which, on the feed or input side, includes the supply wires 23 and 24 together with the neutral or ground wire 25. These supply wires of the circuit are led into the cabinet through the rear wall conduit 22 with the wires 23 and 24 extended and attached to suitable terminals of the connecting block assembly 26. The ground or neutral wire 25 is connected to the block 27 from which it is extended upwardly through the cabinet in a manner to be hereinafter described. The input or feed side of the meter M is connected into the circuit by the supply or feed wires 23' and 24' which extend from suitable terminals of the connecting block 26 to carry the current supplied to the block by the wires 23 and 24 to the meter M.

The load or output side of the circuit from the meter M to the point or points of consumption is, in the present example, led out from the cabinet C through an opening in the bottom wall 15 of the cabinet into a suitable conduit 28 secured to the cabinet bottom wall. Similarly in this example, I have shown a separate conduit or the like 29 suitably connected into an opening in the bottom wall 15 of the cabinet, through which a ground wire may be led from the cabinet for the purpose of grounding the circuit.

In this instance, the load side of the circuit consists of the wires 30 and 31 which are properly connected into the meter M to carry the metered current therefrom and which are extended from the lower side of the meter over to and adjacent the side wall 19 of the cabinet and downwardly through the cabinet to conduit 28. The load or metered current supply wires 30 and 31 are then extended out through the conduit 28 to any desired location, such for example, as an adjacent switch or fuse box (not shown). The neutral wire 25 of this three-wire circuit is brought from the block 27, in a manner to be hereinafter described, to the conduit 28 through which it is outwardly led from the cabinet. In this particular example, a ground wire 32 is provided which extends from the neutral wire 25 with which it is connected, outwardly from the cabinet through the conduit 29 which is provided therefor, to any suitable or desired point of grounding.

With the meter M and the conduits 22, 28 and 29, together with the wires forming the feed and load sides of the circuit relatively arranged in the cabinet C and with respect to each other, as hereinbefore described, my invention further provides an arrangement of guard walls or barriers in cooperative combination with the foregoing elements in order to prevent unauthorized tapping of the circuit in advance of the meter. As an example of a possible form and arrangement of guard or protecting walls, referring now to Figs. 1 and 2 of the drawings, I provide a horizontally disposed wall 33 within the cabinet C disposed transversely thereacross but spaced at its opposite ends from the adjacent opposite walls 11 and 12 respectively of the cabinet. This horizontal wall 33 is located in the cabinet, in this instance below but in proximity to the block 27, and between this block and the conduits 28 and 29 which open through the bottom wall 15 of the cabinet, so that the wall is interposed as a barrier between the bottom wall openings to the conduits 28 and 29, and the wires of the feed side of the circuit 23 and 24, and 23' and 24'.

The arrangement of barrier or guard walls of the present example also includes the vertically disposed opposite side guard walls 34 and 35 which are mounted and fixed in the cabinet extending upwardly from the opposite ends of the horizontal or lower guard wall 33. Each of the side guard walls 34 and 35 is mounted substantially parallel with the adjacent side walls 11 and 12 of the cabinet although of course the invention is not so limited and each extends upwardly through the cabinet a distance beyond the upper edge or side of the connecting block assembly 26. The upper ends of the side guard walls 34 and 35 terminate spaced a distance below the meter M, although if desired or found expedient, these walls may each be extended upwardly from their locations in the preferred form of Fig. 1, to terminate with their upper end edges in close proximity to but spaced a slight distance from and below the lower side of the meter M, as clearly indicated by the dotted line extensions of these walls in Fig. 1.

The protecting or guard walls 33, 34 and 35 are mounted and secured in any suitable manner to the rear wall 10 of the cabinet C and extend outwardly or forwardly through the cabinet to terminate with their forward or outer edges substantially in the plane of the under surface of the cabinet cover or closure C when the latter is in its mounted position drawn down into sealing engagement on the cabinet, so that the cover 16 in its mounted cabinet closing position engages and fits upon the forward or outer edges of these guard walls. In this manner, the space within the arrangement of guard walls is closed against access from the lower side and the opposite sides by the barrier or guard walls 33, 34 and 35 themselves, and at the rear and the forward sides by the rear wall of the cabinet and the cabinet cover 16, respectively.

The arrangement of the wires forming the circuit through the meter cabinet and meter therein are so arranged relative to the system of guard walls as to prevent access to the wires forming the feed side of the circuit in advance of the meter, to thereby prevent unauthorized tapping of these wires without first breaking through from the exterior of the cabinet itself or the conduits leading to the cabinet. For example, in the arrangement of Figs. 1 and 2, the feed wires 23 and 24 are brought into the cabinet at the rear through the conduit 22 and into the space between the side guard walls 34 and 35 and the bottom guard wall 33. The feed circuit then passes through the connecting block assembly 26 which is also located within the space between the guard walls and passes from this block through the feed wires 23' and 24' to the meter M. Thus, this arrangement of guard walls provides an effective barrier against insertion of wires or other instrumentalities through the conduits 28 or 29 at the bottom wall of the cabinet for the purpose of engaging or contacting with any of the wires 23, 24 or 23', 24', which comprise the feed side of the circuit to the meter M. The only manner in which these feed circuit wires are accessible when the cover is in cabinet closing position is to pierce the cover which is of course in plain view to an observer, or pierce the side walls of the cabinet above the upper ends of the side guard walls 34 and 35, or, and even more difficult, to pierce both walls of the cabinet and the guard walls themselves.

The load wires which carry the metered current from the meter M to the output or load circuit conduit 28 are brought from the meter downwardly through the cabinet between a side wall of the cabinet and one of the side guard walls. For instance, in the present example, these wires are brought between the cabinet side wall 19 and the side guard wall 35 to the lower end of the cabinet where they are led outwardly through the conduit 28. The neutral wire 25 of this three-wire circuit of the example is brought from the block 27 in the space between the guard walls outwardly and around the upper end of the side guard wall 35 and then downwardly between this guard wall and the side wall 19 of the cabinet, and then outwardly through the conduit 28. Attention is here directed to the fact that in the customary or usual meter installation, the load wires are led from the meter or meter cabinet by a suitable conduit to an adjacent switch or fuse box, thus making it easy for an unauthorized person to shove or force a wire or other instrument through the connecting conduit, such for example, as the conduits 28 or 29, into the meter cabinet, and into engagement or contact with feed wires of the circuit ahead of the meter, in order to thereby tap current from the circuit.

A meter cabinet of my invention in the form and arrangement of Figs. 1 and 2, readily lends itself to the type of installations in which a series of meters are mounted side by side in proximity to each other. In order to carry out the installation of such an arrangement of meters, a conduit 36 is extended through the side wall 19 of the cabinet C and extends across the space between wall 19 and the adjacent side guard wall 35, through which guard wall the conduit opens into the space enclosed by the guard walls. Referring now to Fig. 3 of the drawings, an arrangement of a plurality of meter cabinets of the invention is more or less diagrammatically shown as consisting of the cabinets C, C1 and C2, arranged side by side in spaced apart relation. The cabinet C is of the type and arrangement of Figs. 1 and 2 of the drawings, and the conduit 36 leads therefrom to the adjacent cabinet C1. The conduit 36 is extended through the cabinet side wall 11 and the adjacent interior side guard wall 34. The feed circuit embodying the wires 23, 24 and 25 is extended by suitable wires (not shown) through conduit 36 to the connecting block assembly, such as assembly 26 of Fig. 1, of the cabinet C1 from which the circuit is carried to the meter M and out from the meter M in the manner hereinbefore described with respect to cabinet C of Fig. 1. The cabinets of Fig. 3 each have the load or output circuit conduits 28 and 29 extending from their lower side walls, in the manner as hereinbefore described. The same arrangement of conduit 36 is provided between the meter cabinet C1 and C2. The meter cabinets C1 and C2 only differ from the cabinet C in that the feed wires of the circuit instead of being brought into the rear of the cabinet through the conduit 22, are of course brought into a side of the cabinet by a conduit 36.

A modified arrangement of meter cabinet of the invention is disclosed in Fig. 4 of the drawings. This modification includes the meter cabinet C constructed as hereinbefore described and having mounted therein the meter M, the connecting block assembly 26, connecting block 27 and the barrier or guard walls 33, 34 and 35. In the form and arrangement of Fig. 4, the feed wires 23, 24 and 25 are led into the cabinet through the top wall 14 thereof by the conduit 22', instead of through the rear wall of the cabinet as in the form of Figs. 1 and 2. Where the feed wires are brought in through the top wall of the cabinet, they are carried down along one side of the meter and adjacent side wall of the cabinet, in this instance, the side wall 11, to a suitable opening 34' formed through the side barrier or guard wall 34, from which opening these feed wires are led to the connecting blocks 26 and 27 in the same manner described in connection with Figs. 1 and 2. The wires 30 and 31 forming the load side of the circuit extend from the meter M through the cabinet in accordance with the arrangement of Figs. 1 and 2 and are led out from the cabinet through the lower wall conduit 28. A lower wall conduit 29 is also provided through which the ground wire 32 extends from the cabinet.

Thus, in the form and arrangement of Fig. 4, the relationship between the wires forming the feed side of the circuit and those forming the load side of the circuit, with the cabinet and the conduits leading thereto and therefrom in cooperation with the barrier or guard walls 33, 34 and 35, is such that the feed wires of the circuit in advance of the meter can only be tapped or connected to by piercing or forming openings through the conduit 22' external of the cabinet, or through the top or side walls of the cabinet from the exterior thereof. The barrier or guard walls effectively prevent the insertion of wires or other instruments through the conduits 28 or 29 for contact or engagement with any of the feed wires 23, 24 and 25, or 23' and 24' in advance of the meter M.

While in the examples hereof, I have shown the meter cabinets of my invention as used with electrical power circuits of the so-called three-wire type, it will be perfectly obvious to those skilled in the art that circuits of various types may be used, and therefore, I have no intention of limiting my invention to the particular circuit of the illustrated examples. Similarly, my invention is in no sense limited to the size or shape of the meter cabinets, to the meters employed therein or to the arrangements of the electrical fixtures or equipment used within the cabinet, as my invention is of general adaptation to meter mountings and installations where similar or equivalent conditions prevail to those generally outlined herein. The invention, in its broad and basic aspect, consists essentially in interposing an arrangement of barrier means between the feed wires of an electric circuit in a meter cabinet, and those openings or locations in the cabinet at which various instruments can be readily inserted for engaging the feed wires of the circuit for the purpose of unauthorized tapping.

It is also evident that various changes, modifications, additions, eliminations, substitutions, and variations might be resorted to without departing from the spirit and scope of my invention, and hence, I do not wish to limit myself in all respects to the exact and specific disclosures hereof.

What I claim is:—

1. In a meter cabinet having rear, side and end walls and a removable front closure, a meter mounted in the upper portion of such cabinet, a feed wire conduit opening into the cabinet through the rear wall thereof intermediate the meter and the cabinet lower wall, feed wires extending into the cabinet through said conduit, a conduit opening into the cabinet through the cabinet lower wall, said feed wires connected to the meter, load wires extending from the meter downwardly through the cabinet along and adjacent one side wall thereof to said lower wall conduit, and a guard wall disposed transversely of the cabinet for the full depth thereof in a position interposed between the conduit in the cabinet lower wall and the feed wire conduit in the cabinet rear wall.

2. In a meter cabinet, including a rear wall and opposite side and end walls, a meter mounted in the upper portion of said cabinet, a conduit opening into the cabinet through the rear wall thereof intermediate said meter and the cabinet lower wall, feed wires of an electric circuit extended into the cabinet through said rear wall conduit, and electrically connected with the meter thereabove, a conduit opening into the cabinet through the lower wall thereof, load wires of the electric circuit extended from the meter downwardly along one side wall of the cabinet to said lower wall conduit, and an arrangement of guard walls mounted in the cabinet and including a lower horizontally disposed wall interposed between the conduit in the cabinet lower wall and the feed wires from the conduit in the cabinet rear wall, and upwardly extending opposite side guard walls spaced inwardly from the adjacent side walls of the cabinet respectively and terminating at their upper ends spaced from the meter to thereby substantially enclose the feed wires within the cabinet extending from the rear wall conduit to the meter, the said load wires from the meter to the lower wall conduit being disposed between a side wall of the cabinet and the adjacent side guard wall.

3. In a meter cabinet, including a rear wall and opposite side and end walls, a removable closure forming the front wall of the cabinet, a meter mounted in the upper portion of said cabinet, a conduit opening into the cabinet through the rear wall thereof intermediate said meter and the cabinet lower wall, feed wires of an electric circuit extended into the cabinet through said rear wall conduit and electrically connected with the meter thereabove, a conduit opening into the cabinet through the lower wall thereof, load wires of the circuit extended from the meter downwardly along one side wall of the cabinet to said lower wall conduit, a horizontal guard wall disposed transversely of the cabinet intermediate the conduit in the lower cabinet wall and the feed wires from the conduit in the cabinet rear wall, side guard walls extending upwardly from opposite ends of said horizontal guard wall spaced from the opposite side walls respectively of the cabinet and terminating at their upper ends spaced a distance below the meter, the said guard walls being of the full depth of the cabinet and engaged by the inner side of said removable cover, and the said load wires from the meter to the lower wall conduit being disposed between a side wall of the cabinet and the adjacent side guard wall.

4. In a closed meter cabinet having a meter therein, feed wires of the supply circuit extending into the cabinet to the meter, load wires of the circuit extending from the meter to a conduit opening through a wall of the cabinet remote from said feed wires and barrier means in the cabinet interposed between and removed from said feed wires and the load wire conduit to prevent contacting said feed wires by insertion of an instrumentality into the cabinet through said load wire conduit.

5. In a closed meter cabinet having a meter therein, a feed wire conduit opening into the cabinet, feed wires in said conduit extended into and through the cabinet to the meter, a load wire conduit opening into the cabinet at a location spaced from the feed wire conduit, load wires extending through the cabinet from the meter to said load wire conduit, and a guard wall structure interposed between the feed wire conduit and the load wire conduit, such structure including an end wall and opposite side walls disposed relative to the load wire conduit and around said feed wires whereby to prevent contacting the feed wires by inserting an instrument into the cabinet through the load wire conduit.

6. In a closed meter cabinet, a meter in one end portion of the cabinet, a load wire opening through a wall of the cabinet at the end portion thereof opposite said meter, a feed wire opening through a wall of the cabinet spaced from said load wire opening, feed wires extending into the cabinet through said opening for connection to the meter, load wires extending from the meter through the cabinet to said load wire opening, a guard wall extending transversely across the cabinet between said feed wires and said load wire opening, said guard wall at its opposite ends being spaced from the adjacent cabinet walls, respectively, and a side guard wall extending from each end of said transversely disposed guard wall in a direction away from said load wire opening and toward the meter, and said transverse guard wall and side guard walls forming a barrier around said feed wires to prevent contacting the feed wires by an instrument inserted into the cabinet through said load wire opening.

JACOB B. COOPER.